US011479619B2

(12) United States Patent
Kainz et al.

(10) Patent No.: US 11,479,619 B2
(45) Date of Patent: Oct. 25, 2022

(54) AQUEOUS POLYMER DISPERSIONS

(71) Applicant: BASF SE, Ludwigshafen am Rhein (DE)

(72) Inventors: Quirin Maximilian Kainz, Ludwigshafen (DE); Ulrich Tromsdorf, Ludwigshafen (DE); Manfred Dargatz, Ludwigshafen (DE)

(73) Assignee: BASF SE

( * ) Notice: Subject to any disclaimer, the term of this patent is extended or adjusted under 35 U.S.C. 154(b) by 172 days.

(21) Appl. No.: 16/758,491

(22) PCT Filed: Nov. 5, 2018

(86) PCT No.: PCT/EP2018/080099
§ 371 (c)(1),
(2) Date: Apr. 23, 2020

(87) PCT Pub. No.: WO2019/091889
PCT Pub. Date: May 16, 2019

(65) Prior Publication Data
US 2020/0262942 A1    Aug. 20, 2020

(30) Foreign Application Priority Data

Nov. 10, 2017 (EP) ..................... 17201136

(51) Int. Cl.
C08F 2/08 (2006.01)
C08F 220/06 (2006.01)
C08F 220/14 (2006.01)
C08F 265/06 (2006.01)
C08F 2/26 (2006.01)
C08F 220/18 (2006.01)
C08F 220/28 (2006.01)
C08F 2/00 (2006.01)
C08F 212/08 (2006.01)
C08F 230/02 (2006.01)
C08K 5/521 (2006.01)
C09D 5/08 (2006.01)

(52) U.S. Cl.
CPC .............. C08F 2/26 (2013.01); C08F 2/001 (2013.01); C08F 212/08 (2013.01); C08F 220/06 (2013.01); C08F 220/14 (2013.01); C08F 220/1804 (2020.02); C08F 220/1808 (2020.02); C08F 220/283 (2020.02); C08F 230/02 (2013.01); C08K 5/521 (2013.01); C09D 5/08 (2013.01)

(58) Field of Classification Search
CPC ...... C08F 2/001; C08F 212/08; C08F 220/06; C08F 220/14; C08F 220/1804; C08F 220/1808; C08F 230/02
See application file for complete search history.

(56) References Cited

U.S. PATENT DOCUMENTS

| 2,520,959 | A | 9/1950 | Powers | |
|---|---|---|---|---|
| 3,397,165 | A | 8/1968 | Goodman et al. | |
| 6,218,456 | B1 | 4/2001 | Schlarb et al. | |
| 6,576,051 | B2* | 6/2003 | Bardman | C08K 9/08 106/436 |
| 7,285,590 | B2* | 10/2007 | Holub | C08F 2/001 523/201 |
| 9,932,431 | B2* | 4/2018 | Brownell | C09D 133/08 |
| 10,190,002 | B2* | 1/2019 | Bohling | C09D 151/003 |
| 10,519,281 | B2* | 12/2019 | Bohling | C08J 3/05 |
| 2004/0054063 | A1* | 3/2004 | Brown | C09C 1/3684 524/500 |
| 2005/0107527 | A1* | 5/2005 | Holub | C08F 2/22 524/817 |
| 2009/0163619 | A1* | 6/2009 | Hsu | C08F 220/1808 523/335 |
| 2011/0009540 | A1* | 1/2011 | Terrenoire | C09D 143/02 524/145 |
| 2012/0058277 | A1* | 3/2012 | Bohling | C08F 265/06 427/385.5 |
| 2016/0355698 | A1* | 12/2016 | Harris | C09D 151/003 |
| 2017/0096575 | A1* | 4/2017 | Cui | C08F 267/02 |
| 2018/0022954 | A1* | 1/2018 | Belowich | C08F 220/14 524/807 |
| 2018/0230348 | A1* | 8/2018 | Jog | C09K 3/1006 |
| 2018/0305471 | A1* | 10/2018 | Balk | C08F 2/26 |
| 2018/0371267 | A1* | 12/2018 | Li | C09D 7/43 |

FOREIGN PATENT DOCUMENTS

| DE | 40 03 422 A1 | 8/1991 |
|---|---|---|
| DE | 196 24 299 A1 | 1/1997 |
| DE | 196 21 027 A1 | 11/1997 |
| DE | 197 41 184 A1 | 3/1999 |
| DE | 197 41 187 A1 | 3/1999 |
| DE | 198 05 122 A1 | 4/1999 |
| DE | 198 28 183 A1 | 12/1999 |
| DE | 198 39 199 A1 | 3/2000 |
| DE | 198 40 586 A1 | 3/2000 |
| DE | 198 47 115 C1 | 5/2000 |
| EP | 0 771 328 B1 | 10/1998 |
| EP | 0 960 889 A1 | 12/1999 |
| EP | 1 193 298 A1 | 4/2002 |
| EP | 2 426 155 A1 | 3/2012 |
| WO | WO 2009/017757 A2 | 2/2009 |
| WO | WO 2009/115607 A1 | 9/2009 |
| WO | WO 2016/071326 A1 | 5/2016 |

OTHER PUBLICATIONS

International Search Report dated Feb. 21, 2019 in PCT/EP2018/080099 filed on Nov. 5, 2018.

* cited by examiner

*Primary Examiner* — Karuna P Reddy
(74) *Attorney, Agent, or Firm* — Faegre Drinker Biddle & Reath LLP

(57) ABSTRACT

Phosphorus-containing aqueous polymer dispersions and the use thereof as binders in coating formulations.

8 Claims, No Drawings

AQUEOUS POLYMER DISPERSIONS

The present invention relates to a process for producing an aqueous polymer dispersion by free-radically initiated aqueous emulsion polymerization, wherein in an aqueous medium in the presence of at least one phosphorus-containing dispersing aid in a first polymerization stage (polymerization stage 1)

≥1.0 and ≤3.0% by weight of at least one α,β-monoethylenically unsaturated $C_3$- to $C_6$-mono- or -dicarboxylic acid (monomers A1), ≥1.5 and ≤6.0% by weight of at least one ethylenically unsaturated compound having at least one phosphorus-containing group (monomers A2), ≥91.0% and ≤97.5% by weight of at least one ethylenically unsaturated compound distinct from the monomers A1 and A2 (monomers A3), wherein the amounts of the monomers A1 to A3 sum to 100% by weight (total monomer amount 1), are free-radically polymerized to afford a polymer 1 and subsequently in the presence of the polymer 1 in a second polymerization stage (polymerization stage 2)

≤0.1% by weight of at least one α,β-monoethylenically unsaturated $C_3$ to $C_6$-mono- or -dicarboxylic acid (monomers B1), ≤0.1% by weight of at least one ethylenically unsaturated compound having at least one phos-phorus-containing group (monomers B2), ≥99.8% and ≤100% by weight of at least one ethylenically unsaturated compound distinct from the monomers B1 and B2 (monomers B3), wherein the amounts of the monomers B1 to B3 sum to 100% by weight (total monomer amount 2), are free-radically polymerized to afford a polymer 2 with the proviso that the type and amounts of the monomers A1 to A3 are chosen such that the resulting polymer 1 has a glass transition temperature $Tg^1$ in the range ≥−10° C. and ≤15° C., the type and amounts of the monomers B1 to B3 are chosen such that the resulting polymer 2 has a glass transition temperature $Tg^2$ which is at least 10° C. above the glass transition temperature $Tg^1$ [$Tg^2=Tg^1+$ ≥10° C.], the ratio of total monomer amount 1 to total monomer amount 2 is 70% to 85% by weight to 15% to 30% by weight and the amount of the at least one phosphorus-containing dispersant is ≥0.5% by weight based on the sum of total monomer amount 1 and total monomer amount 2 (total monomer amount).

The present invention further relates to the aqueous polymer dispersions obtainable by the processes and to the use thereof in a very wide variety of fields, in particular in anticorrosion coatings.

Multistage phosphorus-containing aqueous polymer dispersions proceed from the following relevant prior art.

Thus EP-A 1193298 discloses aqueous polymer dispersions whose polymers comprise monomers having a strong acid group in copolymerized form, wherein a strong acid group is to be understood as meaning those having a pKa value of <4 at 20° C., for example sulfonic or phosphoric acid groups. These polymers may optionally also comprise subordinate amounts of carboxylic acid monomers in copolymerized form. The polymerization reaction proceeds under strongly acidic conditions. Any neutralization required is carried out only after the polymerization reaction. The thus obtained aqueous polymer dispersions are advantageously suitable as binders in anticorrosion formulations and high-gloss coatings.

EP-A 2426155 discloses dispersions of multistage dispersion polymers comprising phosphoric acid-containing monomers in copolymerized form and the use thereof in coating formulations. A characterizing feature of the production of the dispersion polymers is the pulsed addition of the phosphorus-containing monomers, wherein this is to be carried out such that 75% to 100% by weight of the phosphorus-containing monomers are to be added over the period in which 10% to 50% by weight of the total monomer amount is added. Here too the polymerization reaction is carried out under strongly acidic conditions. Any neutralization required is carried out only after the polymerization reaction. The thus obtained polymer dispersion particles are said to be advantageously suitable for adsorption on titanium dioxide particles so that these are employed especially in titanium dioxide-containing coating formulations.

The disadvantage of the abovementioned procedures is that the stainless steel polymerization reactors customary in industry are unsuitable for the polymerization reactions in the strongly acidic medium on account of surface corrosion and/or localized pitting corrosion so that special and costly internally coated polymerization reactors or titanium polymerization reactors become necessary for this purpose. The obtained aqueous polymer dispersions are moreover unstable in case of additional use of functional monomers in the polymerization reaction and have a pro-pensity for elevated coagulate formation or even coagulation. Furthermore, aqueous anticorrosion coatings comprising the aqueous polymer dispersions obtained by the abovementioned processes as binders are not entirely convincing in all respects.

The present invention accordingly has for its object to provide a process for producing an aqueous dispersion of phosphorus-containing dispersion polymers whose production may be carried out in polymerization reactors customary in industry, wherein the obtained aqueous polymer dispersion is stable and has a low fine coagulate content and moreover exhibits improved early water resistance, reduced surface corrosion, reduced subsurface corrosion proceeding from a score and improved adhesion properties when it is used in anticorrosion coatings.

The object is achieved by the process defined at the outset and by aqueous polymer dispersions obtainable by this process.

The conduct of free-radically initiated emulsion polymerizations of ethylenically unsaturated compounds (monomers) in an aqueous medium has already been widely described and is therefore well known to the person skilled in the art [in this regard see Emulsionspolymerisation [Emulsion Polymerization] in Encyclopedia of Polymer Science and Engineering, volume 8, pages 659 ff. (1987); D. C. Blackley, in High Polymer Latices, volume 1, pages 35 ff. (1966); H. Warson, The Applications of Synthetic Resin Emulsions, chapter 5, pages 246 ff. (1972); D. Diederich, Chemie in unserer Zeit 24, pages 135 to 142 (1990); Emulsion Polymerisation, Inter-science Publishers, New York (1965); DE-A 40 03 422 and Dispersionen synthetischer Hochpolymerer [Dispersions of Synthetic High Polymers], F. Holscher, Springer-Verlag, Berlin (1969)]. The free-radically initiated aqueous emulsion polymerization is typically effected by dispersing the monomers, generally with inclusion of dispersing aids, such as emulsifiers and/or protective colloids, in aqueous medium and polymerizing them using at least one water-soluble free-radical polymerization initiator. Frequently, the residual contents of unconverted monomers in the aqueous polymer dispersions obtained are reduced using chemical and/or physical methods likewise known to a person skilled in the art [see for example EP-A 771328, DE-A 19624299, DE-A 19621027, DE-A 19741184, DE-A 19741187, DE-A 19805122, DE-A 19828183, DE-A 19839199, DE-A 19840586 and 19847115], the polymer solids content is adjusted to a desired value by diluting or concentrating, or further customary added substances, for example foam—or viscosity-modifying additives, are added to the aqueous polymer dispersion. The process according to the invention differs from this general procedure merely in that it is performed in two stages while observing the recited limiting parameters and the specific monomer compositions and a specific pH management.

Production of the aqueous polymer dispersions obtainable by the process according to the invention by two-stage aqueous emulsion polymerization may employ the following ethylenically unsaturated monomers A1, A2, A3, B1, B2 and B3.

Employable monomers A1 include any α,β-monoethylenically unsaturated $C_3$- to $C_6$-mono- or -dicarboxylic acids. Examples of $C_3$- to $C_6$-mono- or -dicarboxylic acids, preferably $C_3$- or $C_4$-mono- or -dicarboxylic acids, are acrylic acid, methacrylic acid, ethyl acrylic acid, itaconic acid, allyl acetic acid, crotonic acid, vinyl acetic acid, vinyl lactic acid, fumaric acid, maleic acid, 2-methyl maleic acid. However, the monomers A1 also comprise the anhydrides of corresponding α,β-monoethylenically unsaturated dicarboxylic acids, for example maleic anhydride or 2-methylmaleic anhydride.

Particularly advantageously employed monomers A1 are acrylic acid, methacrylic acid, itaconic acid, fumaric acid, maleic acid and/or crotonic acid.

The total amount of monomers A1 is ≥1.0% and ≤3.0% by weight, advantageously ≥1.0% and ≤2.0% by weight and particularly advantageously ≥1.1% and ≤1.8% by weight in each case based on the total monomer amount 1.

Contemplated monomers A2 include any ethylenically unsaturated compounds having at least one phosphorus-containing group. Examples thereof are vinylphosphonic acid and/or a (meth)acryloxy(poly)alkoxy phosphate, wherein the (meth)acryloxy(poly)alkoxy phosphate has the following formula I:

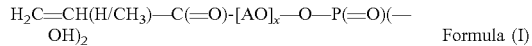

Formula (I)

wherein
AO: represents ethyleneoxy [—OCH$_2$CH$_2$—], propyleneoxy [—OCH(CH$_3$)CH$_2$—], butyleneoxy [—OCH(C$_2$H$_5$)CH$_2$-] or mixtures thereof, wherein ethyleneoxy and/or propyleneoxy are preferred, and
x: represents a number between 1 and 30, wherein numbers between 1 and 20 are preferred and numbers between 1 and 10 are very particularly preferred.

Explicitly mentioned (meth)acryloxy(poly)alkoxy phosphates are compounds of the following formulae:
H$_2$C=CH—C(=O)—OCH$_2$CH$_2$—O—P(=O)(—OH)$_2$
H$_2$C=CH—C(=O)—OCH(CH$_3$)CH$_2$—O—P(=O)(—OH)$_2$
H$_2$C=C(CH$_3$)—C(=O)—OCH$_2$CH$_2$—O—P(=O)(—OH)$_2$
H$_2$C=C(CH$_3$)—C(=O)—OCH(CH$_3$)CH$_2$—O—P(=O)(—OH)$_2$
H$_2$C=CH—C(=O)—[OCH$_2$CH$_2$]$_{4-7}$—O—P(=O)(—OH)$_2$
H$_2$C=CH—C(=O)—[OCH(CH$_3$)CH$_2$]$_{4-7}$—O—P(=O)(—OH)$_2$
H$_2$C=C(CH$_3$)—C(=O)—[OCH$_2$CH$_2$]$_{4-7}$—O—P(=O)(—OH)$_2$
H$_2$C=C(CH$_3$)—C(=O)—[OCH(CH$_3$)CH$_2$]$_{4-7}$—O—P(=O)(—OH)$_2$
and especially preferably
H$_2$C=C(CH$_3$)—C(=O)—[OCH$_2$CH$_2$]$_{4-7}$—O—P(=O)(—OH)$_2$
H$_2$C=C(CH$_3$)—C(=O)—[OCH(CH$_3$)CH$_2$]$_{4-7}$—O—P(=O)(—OH)$_2$
H$_2$C=CH—C(=O)—[OCH(CH$_3$)CH$_2$]$_{4-7}$—O—P(=O)(—OH)$_2$
H$_2$C=CH—C(=O)—OCH$_2$CH$_2$—O—P(=O)(—OH)$_2$
H$_2$C=C(CH$_3$)—C(=O)—OCH$_2$CH$_2$—O—P(=O)(—OH)$_2$ The abovementioned preferred (meth)acryloxy(poly)alkoxy phosphates are commercially available, for example as Sipomer® PAM-100, Sipomer® PAM-200, Sipomer® PAM-300 or Sipomer® PAM-4000 from Solvay/Rhodia and 2-(methacryloyloxy)ethylphosphate from Sigma-Aldrich/Merck KGaA.

The monomers A1 and A2 of course also comprise the fully or partly neutralized water-soluble salts, in particular the alkali metal salts or ammonium salts, of the abovementioned acids.

The total amount of monomers A2 is ≥1.5% and ≤6.0% by weight, advantageously ≥1.5% and ≤5.0% by weight and particularly advantageously ≥1.5% and ≤4.0% by weight in each case based on the total monomer amount 1.

Employable monomers A3 include all ethylenically unsaturated compounds distinct from the monomers A1 and A2, for example alkyl (meth)acrylates, wherein these preferably comprise alkyl (meth)acrylates whose linear or branched alkyl radical has 1 to 20 carbon atoms, particularly preferably 1 to 10 carbon atoms and very particularly preferably 1 to 8 carbon atoms. It should be noted in this context that "(meth)acrylic acid" compounds or "(meth)acrylate" compounds is generally to be understood as comprehending both the relevant acrylic acid compounds and the relevant methacrylic acid compounds.

Examples of alkyl (meth)acrylates include methyl (meth)acrylate, ethyl (meth)acrylate, n-propyl (meth)acrylate, n-butyl (meth)acrylate, isobutyl (meth)acrylate, sec-butyl (meth)acrylate, n-pentyl (meth)acrylate, isopentyl (meth)acrylate, 2-methylbutyl (meth)acrylate, amyl (meth)acrylate, n-hexyl (meth)acrylate, 2-ethylbutyl (meth)acrylate, pentyl (meth)acrylate, n-heptyl (meth)acrylate, n-octyl (meth)acrylate, 2-ethylhexyl (meth)acrylate, 2-propylheptyl (meth)acrylate, n-decyl (meth)acrylate, undecyl (meth)acrylate and/or n-dodecyl (meth)acrylate.

Preferred alkyl (meth)acrylates are methyl methacrylate, methyl acrylate, ethyl acrylate, n-butyl acrylate, n-butyl methacrylate, n-hexyl acrylate, n-octyl acrylate, 2-ethylhexyl acrylate and/or 3-propylheptyl acrylate.

Also advantageously contemplated as monomers A3 are vinylaromatics having up to 20 carbon atoms.

The vinylaromatics having up to 20 carbon atoms are optionally substituted aromatic systems having a vinyl group in conjugation with the aromatic ring system.

Such substituted vinylaromatics often have one or more, preferably one, linear or branched alkyl groups having 1 to 10 carbon atoms, often 1 to 6 carbon atoms and preferably 1 to 4 carbon atoms on the aromatic or on the vinyl group. If the substituent is on the aromatic, the substituent may preferably be in the ortho or para position, particularly preferably in the para position, to the vinyl group.

Suitable vinylaromatic compounds include in particular vinyltoluene, vinylnaphthalene, α- and p-methylstyrene, α-butylstyrene, 4-n-butylstyrene, 4-n-decylstyrene and/or styrene, wherein, however, styrene and/or α-methylstyrene are particularly preferred.

However, the monomers A3 also comprise ethylenically unsaturated nitriles having up to 20 carbon atoms, such as in particular fumaric acid dinitrile, acrylonitrile and methacrylonitrile, preferably acrylonitrile and methacrylonitrile and particularly preferably acrylonitrile, vinyl esters of carboxylic acids comprising up to 20 carbon atoms, in particular vinyl laurate, vinyl stearate, vinyl propionate, vinyl versatate, vinyl butyrate and vinyl acetate, but preferably vinyl acetate, vinyl and vinylidene halides having up to 10 carbon atoms, such as in particular chlorine-, fluorine- or bromine-substituted ethylenically unsaturated compounds, preferably vinyl chloride and vinylidene chloride and vinyl ethers of alcohols comprising 1 to 10 carbon atoms, such as advantageously methyl vinyl ether, ethyl vinyl ether, n-propyl vinyl ether, isopropyl vinyl ether, n-butyl vinyl ether, sec-butyl vinyl ether, isobutyl vinyl ether, tert-butyl vinyl ether and n-octyl vinyl ether, wherein vinyl ethers of alcohols comprising 1 to 4 carbon atoms are preferred.

It is particularly advantageous when the at least one monomer A3 is to an extent of ≥80% by weight selected from the group comprising n-butyl acrylate, n-butyl methacrylate, 2-ethylhexyl acrylate, styrene and methyl methacrylate.

To subordinate extents, i.e. >0% and ≤20% by weight, advantageously ≥1% and ≤10% by weight and especially advantageously ≥1% and ≤6% by weight, in each case based on the total amount of monomers A3 the monomers A3 may also comprise the following functionalized ethylenically unsaturated monomers.

Contemplated functionalized ethylenically unsaturated monomers include all monoethylenically unsaturated compounds having at least one hydroxyl group, such as especially all hydroxyalkyl, advantageously hydroxy-$C_2$-$C_{10}$-alkyl, preferably hydroxy-$C_2$-$C_4$-alkyl and particularly advantageously hydroxy-$C_2$-$C_3$-alkyl, acrylates and/or methacrylates, wherein in the context of the present document the alkoxylated hydroxyalkyl acrylates and/or methacrylates, i.e. those reacted with alkylene oxides (substantially ethylene oxide and propylene oxide), are also to be regarded as monomers A3. The hydroxyalkyl-containing monomer A3 is advantageously selected from the group comprising diethylene glycol monoacrylate, 4-hydroxybutyl acrylate, 3-hydroxypropyl acrylate, 2-hydroxypropyl acrylate, 2-hydroxyethyl acrylate, diethylene glycol monomethacry-late, 4-hydroxybutyl methacrylate, 3-hydroxypropyl methacrylate, 2-hydroxypropyl methacrylate and 2-hydroxyethyl methacrylate. It is especially advantageous to employ 2-hydroxyethyl acrylate and/or 2-hydroxyethyl methacrylate, wherein 2-hydroxyethyl methacrylate is particularly preferred.

The functionalized ethylenically unsaturated monomers are to be understood as also comprising hydroxyalkyl acrylates and methacrylates having more than one hydroxyl group, for example two to five, preferably two to four, particularly preferably two to three, hydroxyl groups. Examples thereof are glycerol monoacrylate and methacrylate, trimethylolpropane monoacrylate and methacrylate, pentaerythritol monoacrylate and methacrylate as well as monoacrylates and methacrylates of sugar alcohols, such as, for example, sorbitol, mannitol, diglycerol, threitol, erythritol, adonitol (ribitol), arabitol (lyxitol), xylitol, dulcitol (galactitol), maltitol and isomalt.

The functionalized ethylenically unsaturated compounds A3 employable according to the invention also include organic compounds having at least two nonconjugated ethylenically unsaturated groups, such as for example 1,2-, 1,3- and 1,4-butanediol diacrylate, 1,2- and 1,3-propylene glycol (meth)acrylate, 1,6-hexanediol di(meth)acrylate, 1,2-ethylene glycol di(meth)acrylate, neopentyl glycol di(meth)acrylate, diethylene glycol di(meth)acrylate, triethylene glycol di(meth)acrylate, tetraethylene glycol di(meth)acrylate, trimethylolpropane tri(meth)acrylate, trimethylolethane tri (meth)acrylate, pentaerythritol tri- and tetra(meth)acrylate, allyl methacrylate, 1,2-, 1,3- and 1,4-divinylbenzene and mixtures thereof. These compounds are particularly preferably selected from the group consisting of divinylbenzene, 1,4-butanediol diacrylate and allyl methacrylate.

Further functionalized ethylenically unsaturated compounds A3 employable according to the invention are selected from the group consisting of 2-(2-oxoimidazolidin-1-yl)ethyl (meth)acrylate (2-ureidoethyl acrylate and 2-ureidoethyl (meth)acrylate), N-[2-(2-oxooxazolidin-3-yl)ethyl] methacrylate, 2-(acetoacetoxy)ethyl acrylate, acetoacetoxypropyl methacrylate, acetoacetoxybutyl methacrylate, 2-(acetoacetoxy)ethyl methacrylate, diacetone acrylamide (DAAM) and diacetone methacrylamide. Preferred among this group are 2-(2-oxoimidazolidin-1-yl)ethyl (meth)acrylate, (acetoacetoxy)ethyl methacrylate, diacetone acrylamide and/or diacetone methacrylamide and particularly preferred are 2-(2-oxoimidazolidin-1-yl)ethyl (meth)acrylate and (acetoacetoxy)ethyl methacrylate.

However, the functionalized ethylenically unsaturated compounds A3 employable according to the invention further include compounds having a (meth)acrylate group and an epoxy group. Examples especially include glycidyl acrylate and glycidyl methacrylate, preferably glycidyl methacrylate.

Likewise included among the functionalized ethylenically unsaturated compounds A3 employable according to the invention are also ethylenically unsaturated compounds having at least one silicon-containing group, for example vinyltriacetoxysilane, 3-(methacryloyloxy)propyltrimethoxysilane or vinyltriethoxysilane.

It is particularly advantageous when the at least one monomer A3 is to an extent of >0% and ≤20% by weight selected from the group comprising 2-hydroxyethyl acrylate, 2-hydroxyethyl methacrylate, 2-(acetoacetoxy)ethyl methacrylate, 2-ureidoethyl methacrylate, diacetone acrylamide, glycidyl methacrylate, 3-(methacryloyloxy)propyltrimethoxysilane, vinyltriethoxysilane, allyl methacrylate and 1,4-butanediol diacrylate.

The total amount of monomers A3 is ≥91.0% and ≤97.5% by weight, advantageously ≥93.0% and ≤97.5% by weight and particularly advantageously ≥95.2% and ≤97.4% by weight in each case based on the total monomer amount 1.

According to the invention the type and the amounts of the monomers A1 to A3 are chosen such that the polymer 1 obtained therefrom after the polymerization has a glass transition temperature $Tg^1$ measured according to DIN EN ISO 11357-2 (2013-09) [differential scanning calorimetry, midpoint temperature, heating rate 20 K/min] in the range ≥−10° C. and ≤15° C., advantageously ≥−5° C. and ≤10° C. and especially advantageously ≥−5° C. and ≤5° C. It should be noted that all glass transition temperatures reported in this document are determined by the abovementioned method.

It is known to those skilled in the art that according to Fox (T. G. Fox, Bull. Am. Phys. Soc. 1956 [Ser. II] 1, page 123 and according to Ullmann's Encyclopedia of Industrial Chemistry, vol. 19, page 18, 4th edition, Verlag Chemie, Weinheim, 1980) the glass transition temperature of at most weakly crosslinked copolymers may be estimated to a good approximation using the following formula:

$$1/Tg = x_1/Tg^1 + x_2/Tg^2 + \ldots x_n/Tg^n,$$

wherein $x_1, x_2, \ldots X_n$ are the mass fractions of the monomers $1, 2, \ldots n$ and $Tg^1, Tg^2 \ldots Tg^n$ are the glass transition temperatures in degrees Kelvin of the respective polymers composed only of one of the monomers $1, 2, \ldots n$. The glass transition temperatures of these homopolymers of most ethylenically unsaturated monomers are known (or may be determined experimentally in a simple manner known per se) and are recited for example in J. Brandrup, E. H. Immergut, Polymer Handbook 1st Ed. J. Wiley, New York, 1966, 2nd Ed. J. Wiley, New York, 1975 and 3rd Ed. J. Wiley, New York, 1989, and also in Ullmann's Encyclopedia of Industrial Chemistry, page 169, Verlag Chemie, Weinheim, 1992.

Employed in the first polymerization stage are advantageously

≥1.0% and ≤3.0% by weight of acrylic acid, methacrylic acid, itaconic acid, fumaric acid, maleic acid and/or crotonic acid, ≥1.5% and ≤6.0% by weight of $H_2C=C(CH_3)-C(=O)-[OCH(CH_3)CH_2]_{4-7}-O-P(=O)(-OH)_2$, $H_2C=C(CH_3)-C(=O)-[OCH_2CH_2]_{4-7}-O-P(=O)(-OH)_2$ and/or $H_2C=C(CH_3)-C(=O)-OCH_2CH_2-O-P(=O)(-OH)_2$, ≥81% and ≤97.5% by weight of n-butyl acrylate, n-butyl methacrylate, 2-ethylhexyl acrylate, styrene and/or methyl methacrylate and ≥0% and ≤10% by weight of 2-hydroxyethyl acrylate, 2-hydroxyethyl methacrylate, 2-(acetoacetoxy)ethyl methacrylate, 2-ureidoethyl methacrylate, diacetone acrylamide, glycidyl methacrylate, 3-(methacryloyloxy)propyltrimethoxysilane, vinyltriethoxysilane, allyl methacrylate and/or 1,4-butanediol diacrylate, and particularly preferably ≥1.0% and ≤2.0% by weight of acrylic acid and/or methacrylic acid, ≥1.5% and ≤5.0% by weight of $H_2C=C(CH_3)-C(=O)-[OCH(CH_3CH_2)]_{4-7}-O-P(=O)(-OH)_2$ ≥85% and ≤97.5% by weight of methyl methacrylate, styrene and/or 2-ethylhexyl acrylate and ≥0% and ≤8.0% by weight of (acetoacetoxy)ethyl methacrylate and/or vinyl triethoxysilane.

Contemplated monomers B1 include all of the abovementioned monomers A1. The amounts of monomers B1 are ≤0.1% by weight, advantageously ≤0.05% by weight and especially advantageously ≤0.01% by weight in each case based on the total monomer amount 2.

Analogously, contemplated monomers B2 include all of the abovementioned monomers A2. The amounts of monomers B2 are ≤0.1% by weight, advantageously ≤0.05% by weight and especially advantageously ≤0.01% by weight in each case based on the total monomer amount 2.

However, advantageously no monomers B1 and B2 whatsoever are employed.

Contemplated monomers B3 in principle include all of the abovementioned monomers A3, wherein, however, the proportion of the functionalized ethylenically unsaturated monomers is ≤1.0% by weight, advantageously ≤0.5% by weight and especially advantageously ≤0.1% by weight in each case based on the total amount of monomers B3. Particularly advantageously employed as monomers B3 are n-butyl acrylate, n-butyl methacrylate, 2-ethylhexyl acrylate, styrene and methyl methacrylate where the proportion thereof is ≥99.0% by weight, preferably ≥99.5% by weight and particularly preferably ≥99.9% by weight in each case based on the total amount of monomers B3. The monomers B3 are particularly advantageously selected to an extent of 100% by weight from the group comprising n-butyl acrylate, n-butyl methacrylate, 2-ethylhexyl acrylate, styrene and methyl methacrylate.

According to the invention the type and the amounts of the monomers B1 to B3 are chosen such that the polymer 2 obtained therefrom after the polymerization has a glass transition temperature $Tg^2$ which is at least 10° C. above the glass transition temperature $Tg^1$ [$Tg^2=Tg^1+≥10°$ C.]. The glass transition temperature $Tg^2$ is advantageously at least 15° C. above the glass transition temperature $Tg^1$. The glass transition temperature $Tg^2$ is therefore in the range ≥0° C. and ≤80° C., advantageously ≥10° C. and ≤60° C. and particularly advantageously ≥10° C. and ≤40° C.

Employed in the second polymerization stage are advantageously

≥0% and ≤95% by weight of n-butyl methacrylate,

≥2% and ≤90% by weight of styrene and

≥0% and ≤40% by weight of methyl methacrylate and/or 2-ethylhexyl acrylate and particularly preferably ≥5% and ≤95% by weight of n-butyl methacrylate, ≥2% and ≤70% by weight of styrene and ≥0% and ≤25% by weight of methyl methacrylate and/or 2-ethylhexyl acrylate.

The type and amounts of the monomers A1 to A3 and B1 to B3 are advantageously chosen such that the obtained polymer 1 has a glass transition temperature $Tg^1$ in the range ≥−5° C. and ≤10° C. and the obtained polymer 2 has a glass transition temperature $Tg^2$ in the range ≥10° C. and ≤40° C.

It should be noted that the quantity ratio of total monomer amount 1 to total monomer amount 2 is 70% to 85% by weight to 15% to 30% by weight and advantageously 70% to 80% by weight to 20% to 30% by weight.

According to the invention it should be noted that the abovementioned monomers A1 to A3 and B1 to B3 may be employed individually or else as mixtures. Of the monomers A1 to A3 in each case the total amounts or portions may be initially charged in the aqueous polymerization medium before initiation of the polymerization reaction and any remaining portions may be added under polymerization conditions. However, it is also possible for the total amounts of the monomers A1 to A3 (total monomer amount 1) to be added to the aqueous polymerization medium under polymerization conditions.

In a preferred embodiment in the first polymerization stage at least a portion ≤10% by weight of the total monomer amount 1 is initially charged in the aqueous polymerization medium before initiation of the polymerization reaction and the remaining residual amount is added to the aqueous polymerization medium under polymerization conditions while in the second polymerization stage the total amount of the monomers B1 to B3 (total monomer amount 1) is added to the aqueous polymerization medium under polymerization conditions. The monomers A1 to A3 and B1 to B3 may each be added to the aqueous polymerization medium in individual streams, as a monomer mixture or in the form of an aqueous monomer emulsion discontinuously or continuously at constant or varying flow rates.

However, it is particularly advantageous when the monomers of the first and the second polymerization stage are employed as monomer mixtures, especially advantageously as aqueous monomer emulsions. Advantageously at least ≥90% by weight and especially advantageously ≥95% by weight or the total amounts of the monomer mixtures of the first and the second polymerization stages are added to the aqueous polymerization medium as aqueous monomer emulsions under polymerization conditions.

The free-radically initiated aqueous emulsion polymerization according to the invention is generally performed in the presence of a free-radical polymerization initiator (free-radical initiator). Contemplated free-radical initiators include all those capable of initiating a free-radical aqueous emulsion polymerization. These may in principle be peroxides or azo compounds. Redox initiator systems are of course also contemplated. Employable peroxides in principle include inorganic peroxides, such as hydrogen peroxide or peroxodisulfates, such as the mono- or dialkali metal or ammonium salts of peroxodisulfuric acid, for example the mono- and disodium, -potassium or ammonium salts, or organic peroxides such as alkyl hydroperoxides, for example tert-butyl hydroperoxide, p-menthyl hydroperoxide or cumyl hydroperoxide, and also dialkyl or diaryl peroxides, such as di-tert-butyl or di-cumyl peroxide. Azo compounds used are essentially 2,2'-azobis(isobutyronitrile), 2,2'-azobis (2,4-dimethylvaleronitrile) and 2,2'-azobis(amidinopropyl) dihydrochloride (AIBA, corresponds to V-50 from Wako Chemicals). It is of course also possible to use so-called redox initiator systems as free-radical initiators. Suitable oxidizing agents for redox initiator systems are essentially the peroxides specified above. Corresponding reducing agents which may be used are sulfur compounds with a low oxidation state, such as alkali metal sulfites, for example potassium and/or sodium sulfite, alkali metal hydrogensulfites, for example potassium and/or sodium hydrogensulfite, alkali metal metabisulfites, for example potassium and/or sodium metabisulfite, formaldehydesulfoxylates, for example potassium and/or sodium formaldehydesulfoxylate, alkali metal salts, specifically potassium and/or sodium salts of aliphatic sulfinic acids and alkali metal hydrogensulfides, for example potassium and/or sodium hydrogensulfide, salts of polyvalent metals, such as iron(II) sulfate, iron(II) ammonium sulfate, iron(II) phosphate, ene diols, such as dihydroxymaleic acid, benzoin and/or ascorbic acid, and reducing saccharides, such as sorbose, glucose, fructose and/or dihydroxyacetone.

Initiation of the polymerization reaction is understood to mean the start of the polymerization reaction of the monomers present in the polymerization vessel after the free-radical initiator has formed free radicals. The polymerization reaction can be initiated by addition of free-radical initiator to the aqueous polymerization mixture in the polymerization vessel under polymerization conditions. However, it is also possible to add a portion or the total amount of the free-radical initiator to the aqueous polymerization mixture comprising the initially charged monomers in the polymerization vessel under conditions unsuitable for inducing a polymerization reaction, for example at low temperature, and then establish polymerization conditions in the aqueous polymerization mixture. Polymerization conditions are generally understood to mean those temperatures and pressures under which the free-radically initiated aqueous emulsion polymerization proceeds at sufficient polymerization rate. They depend particularly on the free-radical initiator used. It is advantageous when the type and amount of the free-radical initiator, the polymerization temperature and the polymerization pressure are selected such that the free-radical initiator has a half life of <3 hours and especially advantageously <1 hour, and there are always sufficient starter free-radicals available to initiate and to maintain the polymerization reaction.

A contemplated reaction temperature for the free-radically initiated aqueous emulsion polymerization is the entire range from 0° C. to 170° C. Temperatures employed are generally 50 to 120° C., preferably 60 to 110° C. and especially preferably 60 to 100° C. The free-radically initiated aqueous emulsion polymerization may be performed at a pressure of less than, equal to or greater than 1 atm [1.013 bar (absolute), atmospheric pressure], and so the polymerization temperature may exceed 100° C. and may be up to 170° C. In the presence of monomers A1 to B3 with a low boiling point, the emulsion polymerization is preferably performed under elevated pressure. In this case, the pressure may assume values of 1.2, 1.5, 2, 5, 10, 15 bar (absolute) or even higher values. If the emulsion polymerization is performed under reduced pressure, pressures of 950 mbar, frequently of 900 mbar and often 850 mbar (absolute) are established. Advantageously, the free-radical aqueous emulsion polymerization is performed at 1 atm with exclusion of oxygen, especially under an inert gas atmosphere, for example under nitrogen or argon.

According to the invention the total amount of the free-radical initiator may be initially charged in the aqueous reaction medium before initiation of the polymerization reaction. However, it is also possible optionally to initially charge only a portion of the free-radical initiator in the aqueous reaction medium before initiation of the polymerization reaction and then add the total amount/any remaining residual amount in the first and/or second polymerization stage continuously or discontinuously according to consumption under polymerization conditions during the free-radically initiated emulsion polymerization. It is of course possible to use different free-radical initiators in different amounts in the first and in the second polymerization stage. In a preferred embodiment a portion of the free-radical initiators is initially charged in the aqueous reaction medium before initiation of the polymerization reaction and the remaining residual amount is added simultaneously with the monomer addition during the first and the second polymerization stage.

The total amount of free-radical initiators is generally ≥0.05% and ≤5% by weight, preferably ≥0.1% and ≤3% by weight and particularly preferably ≥0.1% and ≤1.5% by weight in each case based on the total monomer amount.

To adjust the weight-average molecular weights of the polymers formed in the first and in the second polymerization stage, free-radical chain-transferring compounds (chain transfer agents) may be employed. Employed compounds are essentially aliphatic and/or araliphatic halogen compounds, such as, for example, n-butyl chloride, n-butyl bromide, n-butyl iodide, methylene chloride, ethylene dichloride, chloroform, bromoform, bromotrichloromethane, dibromodichloro-methane, carbon tetrachloride, carbon tetrabromide, benzyl chloride, benzyl bromide, organic thio compounds, such as primary, secondary or tertiary aliphatic thiols, such as ethanethiol, n-propanethiol, 2-propanethiol, n-butanethiol, 2-butanethiol, 2-methyl-2-propanethiol, n-pentanethiol, 2-pentanethiol, 3-pentanethiol, 2-methyl-2-butanethiol, 3-methyl-2-butanethiol, n-hexanethiol, 2-hexanethiol, 3-hexanethiol, 2-methyl-2-pentanethiol, 3-methyl-2-pentanethiol, 4-methyl-2-pentanethiol, 2-methyl-3-pentanethiol, 3-methyl-3-pentanethiol, 2-ethylbutanethiol, 2-ethyl-2-butanethiol, n-heptanethiol and its isomeric compounds, n-octanethiol and its isomeric compounds, n-nonanethiol and its isomeric compounds, n-decanethiol and its isomeric compounds, n-undecanethiol and its isomeric compounds, n-dodecanethiol and its isomeric compounds, n-tridecanethiol and its isomeric compounds, substituted thiols, for example 2-hydroxyethanethiol, aromatic thiols, such as benzenethiol, ortho-, meta-, or para-methylbenzenethiol, mercaptoalkanoic acid and derivatives thereof, such as 6-methylheptyl 3-mercaptopropionate or 2-ethylhexyl 2-mercaptoethanoate and all further sulfur compounds described in the polymer handbook 3rd edition, 1989, J. Brandrup and E. H. Immergut, John Wiley & Sons, Section II, pages 133 to 141, but also aliphatic and/or aromatic aldehydes, such as acetaldehyde, propionaldehyde and/or benzaldehyde, unsaturated fatty acids, such as oleic acid, dienes having nonconjugated double bonds, such as divinyl methane or vinylcyclohexane or hydrocarbons having easily abstractable hydrogen atoms, such as toluene for example. However, it is also possible to use mixtures of mutually nondisruptive representatives of the abovementioned chain transfer agents.

According to the invention the total amount of the chain transfer agent may be initially charged in the aqueous reaction medium before initiation of the polymerization reaction. However, it is also possible optionally to initially charge only a portion of the chain transfer agent in the aqueous reaction medium before initiation of the polymerization reaction and then add the total amount/any remaining residual amount in the first and/or second polymerization stage continuously or discontinuously as required under polymerization conditions during the free-radically initiated emulsion polymerization. It is of course possible to use different chain transfer agents in different amounts in the first and in the second polymerization stage.

The total amount of chain transfer agent is generally $\geq 0\%$ and $\leq 5\%$ by weight, preferably $\geq 0\%$ and $\leq 2\%$ by weight and particularly preferably $\geq 0\%$ and $\leq 1\%$ by weight in each case based on the total monomer amount.

It is essential to the invention that the aqueous emulsion polymerization is performed in the presence of at least one phosphorus-containing dispersing aid which keeps both the monomer droplets and the polymer particles formed distributed in the aqueous phase and thus ensures the stability of the produced aqueous polymer dispersion. Suitable phosphorus-containing dispersing aids in principle include all dispersing aids comprising at least one phosphorus-containing group.

Suitable phosphorus-containing dispersing aids include for example mono- and/or diesters of phosphoric acid with alkoxylated and/or non-alkoxylated $C_6$- to $C_{30}$-fatty alcohols, as disclosed, for example, in WO 2009/17757, sections [0006], [0007] and [0034] to [0065] or in WO 2009/115607, page 4, lines 22 to 34 and page 25, line 31 to page 26, line 14. It should be noted that in the context of the present document explicit reference is to be made to these literature citations and accordingly the phosphorus-containing dispersing aids disclosed therein should be considered as a constituent of this document.

However, it is particularly advantageous in the context of the present document to employ phosphorus-containing dispersing aids selected from compounds of formula II

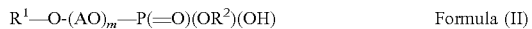

$$R^1\text{—}O\text{-}(AO)_m\text{—}P(\!=\!O)(OR^2)(OH) \qquad \text{Formula (II)}$$

wherein m represents an integer of 0 to 30, preferably 5 to 25 and especially preferably 5 to 20, AO represents alkyleneoxy, as defined for the compounds of general formula I, $R^1$ represents $C_6$-$C_{30}$-alkyl, preferably $C_8$-$C_{22}$-alkyl and especially preferably $C_{11}$-$C_{14}$-alkyl and $R^2$ represents H or a group -$(AO)_m$—$R^{2a}$, wherein $R^{2a}$ is as defined for $R^1$ and AO and m have one of the definitions specified above, wherein, however, $R^2$ advantageously represents H, and the alkali metal or ammonium salts of the abovementioned compounds of formula II.

The abovementioned phosphorus-containing dispersing aids are familiar to those skilled in the art and commercially available, for example as Maphos® 24 T (BASF BTC),
Maphos® 10 T (BASF BTC)
Amphisol® A (DSM Nutritional Products Europe Ltd.)
Colafax® CPE (Colonial Chemical, Inc.)
Crodafos® MCA (Croda Inc.),
Crodafos® CES (Croda Inc.),
Crodafos® HCE (Croda Inc.),
Crodafos® 1435 (Croda Inc.),
Crodafos® CS 20 Acid (Croda Inc.),
Crodafos® CP (Croda Inc.),
Hostaphat® CC100 (Clariant International Ltd.),
Rhodafac® RS-410 (Solvay S.A.)
Rhodafac® RS-610 (Solvay S.A.)
Rhodafac® RS-610/A25 (Solvay S.A.)
Rhodafac® RS-610 E (Solvay S.A.)
Rhodafac® RS-710 (Solvay S.A.)
Rhodafac® RS-710 E (Solvay S.A.) or
Lutensit® A-EP (BASF SE)

The amount of the at least one phosphorus-containing dispersing aid employed according to the invention is $\geq 0.5\%$ by weight, advantageously $\geq 0.5\%$ and $\leq 4.0\%$ by weight, preferably $\geq 0.5\%$ and $\leq 2.0\%$ by weight and particularly preferably $\geq 0.7\%$ and $\leq 1.5\%$ by weight in each case based on the total monomer amount.

According to the invention the total amount of the phosphorus-containing dispersing aid may be initially charged in the aqueous reaction medium before initiation of the polymerization reaction.

However, it is also possible optionally to initially charge only a portion of the phosphorus-containing dispersing aid in the aqueous reaction medium before initiation of the polymerization reaction and then add the total amount/any remaining residual amount in the first or in the first and the second polymerization stage continuously or discontinuously as required under polymerization conditions during the free-radically initiated emulsion polymerization. It is of course possible to use different phosphorus-containing dispersing aids in different amounts in the first and in the second polymerization stage. Advantageously $\geq 50\%$ by weight of the at least one phosphorus-containing dispersing aid are added to the aqueous reaction medium during the polymerization reaction as a constituent of the aqueous monomer emulsion. However, it should be noted that at least a portion of the at least one phosphorus-containing dispersing aid is already present during the first polymerization stage. It is advantageous when the amount of the at least one phosphorus-containing dispersing aid is $\geq 0.5\%$ by weight and advantageously $\geq 0.8\%$ by weight at all times during the aqueous emulsion polymerization in each case based on the total amount of monomers A1 to B3 added to the aqueous polymerization mixture at the time in question.

Optionally also employable in addition to the at least one phosphorus-containing dispersing aid are further protective colloids and/or emulsifiers typically used for performing free-radical aqueous emulsion polymerizations.

Suitable protective colloids are, for example, polyvinyl alcohols, cellulose derivatives or copolymers comprising vinyl pyrrolidone. A detailed description of further suitable protective colloids may be found in Houben-Weyl, Methoden der organischen Chemie, vol. XIV/1, Makromolekulare Stoffe, pages 411 to 420, Georg-Thieme-Verlag, Stuttgart, 1961. It is of course also possible to use mixtures of emulsifiers and/or protective colloids. Additional dispersing aids employed are preferably exclusively emulsifiers which unlike the protective colloids have relative molecular weights of typically below 1000. They may be either anionic, cationic, or nonionic. When mixtures of surface-active substances are used, the individual components must of course be compatible with one another and this may be checked using a few preliminary experiments if there is any doubt. Anionic emulsifiers are generally compatible with one another and with nonionic emulsifiers. The same also applies to cationic emulsifiers, whereas anionic and cationic emulsifiers are mostly not compatible with one another. Commonly used emulsifiers are, for example, ethoxylated mono-, di- and trialkylphenols (degree of ethoxylation: 3 to 50, alkyl radical: C4 to C12), ethoxylated fatty alcohols (degree of ethoxylation: 3 to 50; alkyl radical: C8 to C36) and alkali metal and ammonium salts of alkyl sulfates (alkyl radical: C8 to C12), of sulfuric monoes-ters of ethoxylated alkanols (degree of ethoxylation: 4 to 30, alkyl radical: C12 to C18) and ethoxylated alkylphenols (degree of ethoxylation: 3 to 50, alkyl radical: C4 to C12), of alkylsulfonic acids (alkyl radical: C12 to C18) and of alkylarylsulfonic acids (alkyl radical: C9 to C18). Further suitable emulsifiers are found in Houben-Weyl, Methoden der organischen Chemie, vol. XIV/1, Makromolekulare Stoffe, pages 192 to 208, Georg-Thieme-Verlag, Stuttgart, 1961.

Further surface-active substances that have proven suitable include compounds of general formula III

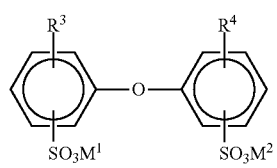

Formula (III)

wherein $R^3$ and $R^4$ represent hydrogen atoms or $C_4$- to $C_{24}$-alkyl and are not simultaneously hydrogen atoms, and $M^1$ and $M^2$ may be alkali metal ions and/or ammonium ions. In general formula III $R^3$ and $R^4$ preferably represent linear or branched alkyl radicals having 6 to 18 carbon atoms, especially having 6, 12 or 16 carbon atoms, or hydrogen, wherein $R^3$ and $R^4$ are not both simultaneously hydrogen atoms. $M^1$ and $M^2$ are preferably sodium, potassium or ammonium, wherein sodium is particularly preferred. Particularly advantageous compounds of general formula III are those in which $M^1$ and $M^2$ are sodium, $R^3$ is a branched alkyl radical having 12 carbon atoms and $R^4$ is a hydrogen atom or $R^3$. Technical grade mixtures comprising a proportion of 50% to 90% by weight of the monoalkylated product, for example Dowfax® 2A1 (brand of Dow Chemical Company), are frequently used. The compounds of general formula III are com-mon knowledge, for example from U.S. Pat. No. 4,269,749, and are commercially available.

If additional dispersing aids are employed in addition to the at least one phosphorus-containing dispersing aid it is advantageous to employ anionic and/or nonionic and especially advantageously anionic surfactants.

The total amount of optional dispersing aids is generally ≥0% and ≤3.0% by weight, preferably ≥0% and ≤2.0% by weight and particularly preferably ≥0.1% and ≤0.5% by weight in each case based on the total monomer amount.

According to the invention the total amount of optional dispersing aid is added continuously or discontinuously as required in the first and/or second polymerization stage under polymerization conditions during the free-radically initiated emulsion polymerization. However, it is also possible optionally to initially charge the total amount or a portion of the optionally employed dispersing aid in the aqueous reaction medium before initiation of the polymerization reaction and add any remaining residual amount during the first and/or the second polymerization stage continuously or discontinuously.

It should further be noted that the free-radically initiated aqueous emulsion polymerization in the first polymerization stage may optionally also be performed in the presence of a polymer seed, for example in the presence of 0.01% to 10% by weight, frequently of 0.05% to 7.0% by weight and often of 0.1% to 4.0% by weight of a polymer seed in each case based on the total amount of monomers.

According to the invention a polymer seed is used especially when control is to be exercized over the particle size of the polymer particles to be produced by a free-radically initiated aqueous emulsion polymerization (in this regard see, for example, U.S. Pat. Nos. 2,520,959 and 3,397,165).

If a polymer seed is used in the process according to the invention its polymer seed particles advantageously have a weight-average diameter Dw≤100 nm, frequently ≥5 nm to ≤50 nm and often ≥15 nm to ≤35 nm.

The polymer seed is typically employed in the form of an aqueous polymer dispersion.

If a polymer seed is used it is advantageous to use an extraneous polymer seed. Unlike a so-called in situ polymer seed which is produced in the reaction vessel before commencement of the actual emulsion polymerization and generally has the same monomeric composition as the polymer 1 produced by the subsequent free-radically initiated aqueous emulsion polymerization, an extraneous polymer seed is understood to mean a polymer seed which has been produced in a separate reaction step and has a monomeric composition distinct from the polymer 1 produced by the free-radically initiated aqueous emulsion polymerization, this, however, meaning nothing other than that production of the extraneous polymer seed and production of the aqueous polymer dispersion employ different monomers or monomer mixtures having a different composition. Production of an extraneous polymer seed is familiar to those skilled in the art and is typically carried out such that a sufficient amount of polymerization initiator is added at the reaction temperature to an initial charge of a relatively small amount of monomers and a relatively large amount of emulsifiers in a reaction vessel.

It is preferable according to the invention to employ an extraneous polymer seed with a glass transition temperature of ≥50° C., frequently ≥60° C. or ≥70° C. and often ≥80° C. or ≥90° C. A polystyrene polymer seed or a polymethylmethacrylate polymer seed is especially preferred.

The total amount of extraneous polymer seed may be initially charged in the polymerization vessel. However, it is also possible to initially charge only a portion of the extraneous polymer seed in the polymerization vessel and add the remaining residual amount together with the monomers A1 to A3/B1 to B3 during the polymerization. However, the total polymer seed amount may also be added in the course of the polymerization if required. It is preferable when the total amount of extraneous polymer seed is initially charged in the polymerization vessel before initiation of the polymerization reaction.

The process according to the invention is advantageously performed such that the second polymerization stage is only commenced once the total monomer amount 1 has been converted to an extent of ≥98% by weight, advantageously ≥99% by weight and especially advantageously ≥99.5% by weight, as is easily determinable using calorimetric measurements familiar to those skilled in the art. Correspondingly, polymerization stage 2 is also carried out up to a monomer conversion of ≥98% by weight, advantageously ≥99% by weight and especially advantageously to an extent of 99.5% by weight of the total monomer amount 2.

It is advantageous according to the invention when the pH of the aqueous polymerization mixture during both the first and the second polymerization stages is in the range ≥3 and ≤8 and especially advantageously in the range ≥4.0 and ≤6.5, measured at room temperature. According to the invention pH measurement or pH testing is carried out such that via a small by-pass conduit a small amount of the aqueous polymerization mixture is continuously discharged from the polymerization vessel and cooled to 20° C. to 25° C. (room temperature), the pH thereof is determined by means of a calibrated pH electrode and the aqueous polymerization mixture is then returned to the polymerization vessel. It is of course also possible to take a small sample of the aqueous polymerization mixture, cool it to room temperature, measure the pH and subsequently return the sample to the aqueous polymerization mixture.

According to the invention pH adjustment may be carried out using any customary bases, such as alkali metal, alkaline earth metal or ammonium hydroxides or carbonates or hydrogencar-bonates, for example NaOH, KOH, $NH_4OH$, $Ca(OH)_2$, $Na_2CO_3$, $K_2CO_3$, $(NH_4)CO_3$, $NaHCO_3$, $KHCO_3$ or $NH_4HCO_3$. Likewise suitable as bases are ammonia and primary, secondary or tertiary organic amines, for example methylamine, ethylamine, 1-propylamine, 2-propylamine, 1-n-butylamine, 2-n-butylamine, 2-methyl–1-propylamine, 2-methyl-2-propylamine etc., dimethyla-mine, diethylamine, di-n-propylamine, diisopropylamine, di-n-butylamine, di-2-methylpropylamine etc., trimethylamine, triethylamine, tri-n-propylamine, triisopropylamine, tri-n-butylamine, tri-2-methylpropylamine etc., but also mixed amines, such as N-methyl-N-ethylamine, N,N-dimethyl-N-ethylamine etc. However, pH adjustment is advantageously carried out using bases having a boiling point of ≤20° C., advantageously ≤10° C. and especially advantageously ≤0° C. at a pressure of 1.013 bar (absolute), such as in particular trimethylamine and ammonia, in particular in the form of its aqueous solution or its basic salts $(NH_4)_2CO_3$, $NH_4HCO_3$, wherein, however, ammonia, especially in the form of its aqueous solution, is particularly preferred.

The aqueous polymer dispersion obtained after the second polymerization stage comprises polymer particles having a weight-average particle diameter in the range ≥50 and ≤500 nm, advantageously in the range ≥50 and ≤200 nm and especially in the range ≥80 and ≤150 nm. According to the invention determination of the weight-average particle diameter is generally carried out according to ISO 13321 with a High Performance Particle Sizer from Malvern at 22° C. and a wavelength of 633 nm.

It will be appreciated that a preferred embodiment also provides the aqueous polymer dispersions obtainable by the process according to the invention and the polymer powders obtainable by drying thereof. The production of polymer powder by drying of aqueous polymer dispersions is familiar to those skilled in the art and is carried out for example by freeze drying or spray drying.

It should be noted that the aqueous polymer dispersions produced by the process according to the invention feature high stability and low coagulate formation. In addition, the V2A- or V4A-steel reactors used for the process according to the invention exhibit markedly reduced, if any, signs of corrosion in particular as a result of the pH testing.

It should also be noted that the aqueous polymer dispersions obtainable by the process according to the invention and the polymer powders obtainable therefrom by drying are advantageously employable as a binder in the production of adhesives, sealants, renders, paper coating slips, fiber nonwovens, flexible roof coatings and paints and also in sand consolidation, as a component in the production of textile or leather auxiliaries and impact modifiers or for modification of mineral binders and plastics.

The aqueous polymer dispersions according to the invention/the polymer powders thereof are especially advantageously suitable as binders in aqueous anticorrosion formulations for metal surfaces, wherein this is to be understood as also including the surfaces of metal alloys. If multi-layer systems are employed the aqueous polymer dispersions according to the invention/the polymer powders thereof may be employed as binders in one or more layers.

If the abovementioned aqueous formulations are used for producing aqueous anticorrosion formulations these aqueous formulations may comprise not only customary constituents, such as organic solvents, coalescing agents, additional additives such as dispersing aids, neutralizing agents, defoamers, thickeners and flow additives and bactericidal or fungicidal auxiliaries, but also pigments, fillers and/or anticorrosion agents.

Employable pigments include in principle all organic and/or inorganic white or colored pigments familiar to those skilled in the art having a particle size ≤15 µm measured according to ISO 1524 with a Hegmann grindometer.

On account of its high refractive index (rutile: 2.70 and anatase: 2.55) and its good hiding power, titanium dioxide in its various modifications may be mentioned as the most important white pigment. However, zinc oxide and zinc sulfide are also used as white pigments. These white pigments may be used in coated or uncoated form. However, organic white pigments, for example non-filming styrene- and carboxyl-rich hollow polymer particles having a particle size of about 300 to 400 nm (so-called opaque particles), are also employed.

As well as white pigments, coloring can be accomplished using a wide variety of different colored pigments that are familiar to those skilled in the art, for example the somewhat less costly inorganic iron oxides or sulfides, cadmium oxides or sulfides, chromium oxides or sulfides and lead oxides or sulfides, lead molybdate, cobalt blue or carbon black, and the somewhat more costly organic pigments, for example phthalocyanines, azo pigments, quinacridones, perylenes or carbazoles.

The aqueous formulations may of course also comprise so-called fillers known to those skilled in the art in addition to the pigments. Fillers are to be understood as meaning substantially pulverulent inorganic materials having a particle size ≤20 µm (according to Hegmann) having a relatively low refractive index compared to the pigments (according to DIN 55943 and DIN 55945 white fillers have refractive index values <1.7). The pulverulent fillers are frequently nat-urally occurring minerals, for example calcite, chalk, dolomite, kaolin, talc, mica, diatomaceous earth, baryte, quartz or talc/chlorite assemblages, but also synthetically produced inorganic compounds, for example precipitated calcium carbonate, calcined kaolin or barium sulfate, and fumed silica. The filler used is preferably calcium carbonate in the form of crystalline calcite or of amorphous chalk.

According to the invention contemplated anticorrosion agents include in particular corrosion inhibitors or anticorrosion pigments.

Examples of corrosion inhibitors are cited in "Corrosion Inhibitors, 2nd Edition, An industrial Guide", Ernest W. Flick, Ed: William Andrew Inc ISBN: 978-0-8155-1330-8. Preferred corrosion inhibitors are hexamine, benzenetriazole, phenylenediamine, dimethylethanolamine, polyaniline, sodium nitrite, cinnamaldehyde, condensation products of aldehydes and amines (imines), chromates, nitrites, phosphates, hydrazine and ascorbic acid.

Examples of anticorrosion pigments are modified zinc orthophosphates (for example HEUCOPHOS® ZPA, ZPO and ZMP), polyphosphates (for example HEUCOPHOS® ZAPP, SAPP, SRPP and CAPP), WSA—Wide Spectrum Anticorrosives (for example HEUCOPHOS® ZAMPLUS and ZCPPLUS) and modified silicate pigments (for example HEUCOSIL® CTF, Halox® 750), e.g. from Heubach GmbH, as well as barium borophosphate (for example Halox® 400), barium phosphosilicates (for example Halox® BW-111, Halox® BW-191), calcium borosili-cates (for example Halox® CW-291, CW-22/221, CW-2230), calcium phosphosilicate (for example Halox® CW-491), strontium phosphosilicate (for example Halox® SW-111) or strontium zinc phosphosilicate (for example Halox® SZP-391) from Halox®.

One embodiment thus also provides aqueous anticorrosion formulations which comprise at least one aqueous polymer dispersion according to the invention or at least one polymer powder according to the invention.

The invention likewise provides a process for coating metal surfaces, wherein an aqueous anticorrosion formulation comprising an aqueous polymer dispersion according to the invention or a polymer powder according to the invention is applied to a metal surface and subsequently dried.

Application of the aqueous anticorrosion formulation to a metal surface may be carried out in known fashion, for example by spraying, troweling, knifecoating, brushing, rolling, roller coating or curtain coating. The volatile constituents of the aqueous formulation are subsequently removed by drying. This procedure may be repeated one or more times if desired. The application quantity is generally chosen such that the dry film layer thickness (after removal of the volatile constituents) is 15 to 150 μm and advantageously 30 to 100 μm.

Substrates treated with the aqueous formulations for anticorrosion purposes are the surfaces of iron, steel, Zn, Zn alloys, Al or Al alloys. The metallic, advantageously fat-free, surfaces may be uncoated, coated with zinc, aluminum or alloys thereof, hot-dip galvanized, electrogalvanized, sherardized or precoated with primers.

The surfaces of iron, steel, zinc, zinc alloys, aluminum or aluminum alloys are concerned here in particular. Steel may comprise the customary alloying components known to those skilled in the art. The surfaces of articles consisting entirely of said metals or alloys may be concerned here. However, the surfaces of articles coated with Zn, Zn alloys, Al or Al alloys may also be concerned, wherein the articles may be made of other materials, for example of other metals, alloys, polymers or composite materials. In a preferred embodiment of the invention steel surfaces or galvanized and/or aluminized steel surfaces are concerned.

Zinc or aluminum alloys are known to those skilled in the art. Typical constituents of zinc alloys especially comprise Al, Pb, Si, Mg, Sn, Cu or Cd. Typical constituents of aluminum alloys especially comprise Mg, Mn, Si, Zn, Cr, Zr, Cu or Ti. The term "zinc alloy" is to be understood as also including Al/Zn alloys in which Al and Zn are present in approximately equal amounts. A person skilled in the art will choose the type and amount of alloying constituents depending on the in-tended use. Zn or aluminum coatings may be applied to steel, for example by hot-dip processes, for example hot-dip galvanizing, or by sherardizing. If the component is immobile or the component geometry does not allow it, corresponding layers may also be applied using thermal spraying (spray galvanizing, spray aluminizing).

The aqueous polymer dispersions according to the invention, in particular the aqueous formulations according to the invention, may advantageously be used to protect from corrosion metallic surfaces which are in contact with atmospheric air during use, but also surfaces which are in contact with water, soil or other corrosive media during use.

The metallic surfaces to be protected from corrosion using the aqueous polymer dispersions according to the invention, in particular the aqueous formulations according to the invention, may in principle be any desired surfaces. However, they are preferably the surfaces of metallic built structures or metal constructions or the components required therefor. Metal constructions or built structures are typically constructed by joining building steel, such as steel beams, steel pipes or steel sheets, together to form corresponding constructions by riveting, welding or screwing. In one embodiment of the invention the coated articles may be immobile metallic constructions such as for example buildings, bridges, transmission towers, tanks, containers, buildings, pipelines, power plants, chemical plants, ships, cranes, poles, sheet pilings, valves, pipes, tanks, fittings, flanges, couplings, hangars, roofs and building steel. In this embodiment anticorrosion coatings are typically applied by painting or spraying in situ. This may be a first-time treatment or maintenance. The drying and curing of such anticorrosion coatings occurs under atmospheric conditions, i.e. at ambient temperature and in the presence of air and customary atmospheric humidity. The relative atmospheric humidity may take any value, but is preferably between 10% and 80% and particularly preferably between 30% and 70%. Depending on the required degree of protection the corrosion protection of surfaces by anticorrosion coatings is also described as low, intermediate and high corrosion protection.

The invention shall be elucidated with reference to the nonlimiting examples which follow.

EXAMPLES

Example 1 (Dispersion 1)

In a 2 l polymerization vessel fitted with feeding devices and a temperature control means at 20° C. to 25° C. (room temperature) under a nitrogen atmosphere
260.0 g of deionized water and
   12.0 g of a 25% by weight aqueous solution of a phosphorus-containing
      dispersing aid (Rhodafac® RS610/A25)
were initially charged and heated to 90° C. with stirring. Once this temperature had been reached 30.4 g of feed 1 were added and then 33.8 g of a 2.5% by weight aqueous solution of ammonium peroxodisulfate were added over 2 minutes and the mixture was then stirred for a further 10 minutes at the abovementioned temperature. Commencing concurrently with the addition of the ammonium peroxodisulfate solution 32.6 g of a 5.3% by weight aqueous solution of ammonia were continuously added over a period of 175 minutes at a constant flow rate.

After the 10 minutes further stirring time had elapsed and while maintaining a temperature of 90° C. the remainder of feed 1 was continuously added over 90 minutes at a constant flow rate. Commencing concurrently with the addition of the remainder of feed 1 48.4 g of a 2.5% by weight aqueous solution of ammonium peroxodisulfate were likewise continuously added over 90 minutes. The polymerization mixture was then allowed to react at 90° C. for a further 15 minutes. Subsequently, and while maintaining a temperature of 90° C., feed 2 was continuously added over 65 minutes at a constant flow rate. 15.2 g of a 2.0% by weight aqueous solution of ammonium peroxodisulfate were continuously added concurrently with feed 2. After termination of feed 2 the polymerization mixture was allowed to react at 90° C. for a further 20 minutes. The obtained aqueous polymer dispersion was then cooled to 75° C. and commencing concurrently 10.1 g of a 10% by weight aqueous solution of tert-butyl hydroperoxide, and in a simultaneous feed 9.9 g of a 6% by weight aqueous solution of Brüggolit® FF6 M (reducing agent from Bruggemann GmbH & Co. KG), were continuously added over 10 minutes. The polymerization mixture was subsequently stirred at 70° C. for 20 minutes, cooled to room temperature and with stirring admixed with 1.2 g of a 5% by weight aqueous solution of Acticid® MBS (biocide from Thor).

Feed 1 (homogeneous mixture of):

| | |
|---|---|
| 110.3 g | deionized water |
| 12.0 g | Rhodafac ® RS610/A25, |
| 2.4 g | 30% by weight aqueous solution of a fatty alcohol polyethylene oxide ether sulfate (Disponil ® FES 993 from BASF SE), |
| 196.9 g | styrene |
| 196.9 g | 2-ethylhexyl acrylate |
| 18.2 g | Sipomer ® PAM-200, |
| 14.1 g | methyl methacrylate, |
| 22.4 g | acetoacetoxyethyl methacrylate, |
| 6.2 g | acrylic acid |

Feed 2 (homogeneous mixture of):

| | |
|---|---|
| 42.4 g | deionized water |
| 2.4 g | Rhodafac ® RS610/A25, |
| 0.6 g | Disponil ® FES 993, |
| 12.1 g | styrene |
| 133.3 g | n-butyl methacrylate |

Before further use the obtained polymer dispersion was passed through a 125 µm filter and a coagulate content <0.1% by weight was determined.

The aqueous polymer dispersion obtained after filtration had a solids content of 50.1% by weight. The weight-average particle diameter was determined as 93 nm and the fine coagulate content as 227 µg/g of aqueous polymer dispersion. The pH was determined as 4.2 at the end of the first polymerization stage and as 6.1 at the end of the second polymerization stage. The dispersion polymer had a glass transition temperature $Tg^1$ of −2.8° C. and a glass transition temperature $Tg^2$ of 16° C.

The solids contents of the obtained aqueous polymer dispersions were generally determined by drying a defined amount of the aqueous polymer dispersion (about 0.8 g) to constant weight at a temperature of 160° C. using a Mettler Toledo HR73 moisture analyzer. Two measurements were carried out in each case. The value reported in the examples is the average of these two measurements.

To determine the fine coagulate content generally in each case 3.0 g of the obtained aqueous polymer dispersion were diluted to 1500 g with deionized water. After pre-rinsing a Klotz PZG3 sample feeder was used to pump 1000 g of the obtained diluted aqueous polymer dispersion through the Klotz LDS 2×2 sensor at room temperature in 2.5 minutes. In combination with the evaluation and control unit (ABAKUS) with PC interface this afforded the values reported in each case which correspond to the counted particles in the range 10-500 µm.

It should be noted that coagulate contents >0.1% by weight and fine coagulate contents >1000 µg/g of aqueous polymer dispersion can lead to problems in filtration (for example by blocking the filters) and are generally associated with disadvantages in their use in coating compositions through the appearance of surface defects and/or imperfections in the coating.

The weight-average particle diameter was generally determined according to ISO 13321 with a Malvern High Performance Particle Sizer at 22° C. and a wavelength of 633 nm.

The pH was generally determined using a calibrated InPro® 325X pH electrode from Mettler-Toledo GmbH.

The glass transition temperatures were generally determined according to DIN EN ISO 11357-2 (2013-09) by differential scanning calorimetry (DSC) with a heating rate of 20 K/min using a DSC Q2000 instrument from TA Instruments. The midpoint temperatures were used for the determination.

Example 2 (Dispersion 2)

Production of example 2 was carried out completely analogously to the production of example 1 with the exception that in feed 1 the acrylic acid was substituted by the same amount of methacrylic acid.

The obtained polymer dispersion had a solids content of 50.1% by weight. The weight-average particle diameter was 99 nm. The coagulate content was <0.1% and the fine coagulate content was determined as 336 µg/g. The dispersion polymer had a glass transition temperature $Tg^1$ of −3.5° C. and a glass transition temperature $Tg^2$ of 17° C.

Example 3 (Dispersion 3)

Production of example 3 was carried out completely analogously to the production of example 1 with the exception that feeds 1 and 2 had the following compositions:

Feed 1 (homogeneous mixture of):

| | |
|---|---|
| 110.3 g | deionized water |
| 12.0 g | Rhodafac ® RS610/A25, |
| 2.4 g | Disponil ® FES 993, |
| 168.6 g | styrene |
| 176.5 g | 2-ethylhexyl acrylate |
| 13.1 g | Sipomer ® PAM-200, |
| 73.1 g | methyl methacrylate, |
| 6.0 g | acetoacetoxyethyl methacrylate, |
| 6.7 g | acrylic acid |

Feed 2 (homogeneous mixture of):

| | |
|---|---|
| 42.4 g | deionized water |
| 2.4 g | Rhodafac ® RS610/A25, |

-continued

| | |
|---|---|
| 0.6 g | Disponil ® FES 993, |
| 72.6 g | styrene |
| 52.4 g | n-butyl methacrylate |
| 8.8 g | methyl methacrylate, |
| 22.2 g | 2-ethylhexyl acrylate |

The obtained polymer dispersion had a solids content of 49.7% by weight. The weight-average particle diameter was determined as 121 nm, the coagulate content as <0.1% by weight and the fine coagulate content as 507 µg/g. The determined glass transition temperatures $Tg^1$ and $Tg^2$ were 6° C. and 23° C.

Example 4 (Dispersion 4)

In a 2 l polymerization vessel fitted with feeding devices and a temperature control means at 20° C. to 25° C. (room temperature) under a nitrogen atmosphere
339.0 g of deionized water and
  10.3 g of Rhodafac® RS610/A25
were initially charged and heated to 90° C. with stirring. Once this temperature had been reached 30.4 g of feed 1 were added and then 33.8 g of a 2.2% by weight aqueous solution of ammonium peroxodisulfate were added over 2 minutes and the mixture was then stirred for a further 10 minutes at the abovementioned temperature. Commencing concurrently with the addition of the ammonium peroxodisulfate solution 40.5 g of a 4.6% by weight aqueous solution of ammonia were continuously added over a period of 175 minutes at a constant flow rate.

After the 10 minutes further stirring time had elapsed and while maintaining a temperature of 90° C. the remainder of feed 1 was continuously added over 90 minutes at a constant flow rate. Commencing concurrently with the addition of the remainder of feed 1 52.8 g of a 2.4% by weight aqueous solution of ammonium peroxodisulfate were likewise continuously added over 90 minutes. The polymerization mixture was then allowed to react at 90° C. for a further 15 minutes. Subsequently, and while maintaining a temperature of 90° C., feed 2 was continuously added over 65 minutes at a constant flow rate. 15.2 g of a 2.0% by weight aqueous solution of ammonium peroxodisulfate were continuously added concurrently with feed 2. After termination of feed 2 the polymerization mixture was allowed to react at 90° C. for a further 20 minutes. The obtained aqueous polymer dispersion was then cooled to 75° C. and commencing concurrently 16.2 g of a 6.8% by weight aqueous solution of tert-butyl hydroperoxide, and in a simultaneous feed 16.0 g of a 4% by weight aqueous solution of Brüggolit® FF6 M, were continuously added over 10 minutes. The polymerization mixture was subsequently stirred at 70° C. for 20 minutes, cooled to room temperature and with stirring admixed with 14.7 g of a 0.4% by weight aqueous solution of Acticid® MBS.
Feed 1 (homogeneous mixture of):

| | |
|---|---|
| 79.7 g | deionized water |
| 12.9 g | Rhodafac ® RS610/A25, |
| 2.6 g | Disponil ® FES 993, |
| 208.5 g | styrene |
| 208.5 g | 2-ethylhexyl acrylate |
| 19.5 g | Sipomer ® PAM-200, |
| 15.2 g | methyl methacrylate, |
| 24.1 g | acetoacetoxyethyl methacrylate, |

-continued

| | |
|---|---|
| 6.7 g | acrylic acid |
| 6.5 g | vinyltriethoxysilane |

Feed 2 (homogeneous mixture of):

| | |
|---|---|
| 33.5 g | deionized water |
| 2.6 g | Rhodafac ® RS610/A25, |
| 0.7 g | Disponil ® FES 993, |
| 13.0 g | styrene |
| 143.3 g | n-butyl methacrylate |

Before further use the obtained polymer dispersion was passed through a 125 µm filter and a coagulate content <0.1% by weight was determined.

The aqueous polymer dispersion obtained after filtration had a solids content of 49.8% by weight. The weight-average particle diameter was determined as 98 nm and the fine coagulate content as 203 µg/g of aqueous polymer dispersion. The pH was determined as 4.1 at the end of the first polymerization stage and as 6.0 at the end of the second polymerization stage. The dispersion polymer had a glass transition temperature $Tg^1$ of −5.4° C. and a glass transition temperature $Tg^2$ of 13° C.

Example 5 (Dispersion 5)

Production of example 5 was carried out completely analogously to the production of example 1 with the exception that 32.6 g of a 5.3% by weight aqueous solution of sodium hydroxide was employed instead of ammonia.

The aqueous polymer dispersion obtained after filtration had a solids content of 50.2% by weight. The weight-average particle diameter was determined as 106 nm, the coagulate content as <0.1% by weight and the fine coagulate content as 373 µg/g of aqueous polymer dispersion. The pH was determined as 4.0 at the end of the first polymerization stage and as 5.9 at the end of the second polymerization stage. The dispersion polymer had a glass transition temperature $Tg^1$ of −2.3° C. and a glass transition temperature $Tg^2$ of 15.7° C.

Example 6 (Dispersion 6)

Production of example 6 was carried out completely analogously to the production of example 1 with the exception that 32.6 g of a 5.3% by weight aqueous solution of trimethylamine was employed instead of ammonia.

The aqueous polymer dispersion obtained after filtration had a solids content of 49.9% by weight. The weight-average particle diameter was determined as 98 nm, the coagulate content as <0.1% by weight and the fine coagulate content as 308 µg/g of aqueous polymer dispersion. The pH was determined as 4.5 at the end of the first polymerization stage and as 6.2 at the end of the second polymerization stage. The dispersion polymer had a glass transition temperature $Tg^1$ of −2.1° C. and a glass transition temperature $Tg^2$ of 16.5° C.

Comparative Example 1

Production of comparative example 1 was carried out completely analogously to the production of example 1 with the exception that feed 1 comprised no Sipomer® PAM-200 and feed 2 additionally comprised 18.2 g of Sipomer® PAM-200.

The polymerization mixture coagulated during feed 1 so that the experiment had to be aborted.

Comparative Example 2

Production of comparative example 2 was carried out completely analogously to the production of example 1 with the exception that feed 1 comprised no acrylic acid and feed 2 additionally comprised 6.2 g of acrylic acid.
The polymerization mixture coagulated during feed 1 so that the experiment had to be aborted.

Comparative Example 3

Production of comparative example 3 was carried out completely analogously to the production of example 1 with the exception that in the initial charge 25.8 g of Disponil® FES 993 were employed instead of 12.0 g of Rhodafac® RS610/A25, in feed 1 altogether 28.1 g and in feed 2 altogether 5.7 g of Disponil® FES 993 were employed and in each case no Rhodafac® RS610/A25 was employed.
The polymerization mixture coagulated during feed 1 so that the experiment had to be aborted.

Comparative Example 4

Production of comparative example 4 was carried out completely analogously to the production of example 1 with the exception that no 5.3% by weight aqueous solution of ammonia was employed and the polymerization batch coagulated at a pH of 2.3 in the first polymerization stage so that the experiment had to be aborted.

Comparative Example 5 (Comparative Dispersion V5)

Production of comparative example 5 was carried out completely analogously to the production of example 1 with the exception that 16.3 g instead of 32.6 g of a 5.3% by weight aqueous solution of ammonia were employed.
The aqueous polymer dispersion obtained after filtration had a solids content of 50.1% by weight. The weight-average particle diameter was determined as 90 nm, the coagulate content as <0.1% by weight and the fine coagulate content as 689 µg/g of aqueous polymer dispersion.
The pH was determined as 2.9 at the end of the first polymerization stage and as 5.3 at the end of the second polymerization stage. The dispersion polymer had a glass transition temperature $Tg^1$ of –2.8° C. and a glass transition temperature $Tg^2$ of 15° C.

Comparative Example 6 (Comparative Dispersion V6)

Production of comparative example 6 was carried out completely analogously to the production of example 1 with the exception that 48.9 g instead of 32.6 g of a 5.3% by weight aqueous solution of ammonia were employed.
The aqueous polymer dispersion obtained after filtration had a solids content of 49.8% by weight. The weight-average particle diameter was determined as 96 nm, the coagulate content as 0.2% by weight and the fine coagulate content as 1083 µg/g of aqueous polymer dispersion. The pH was determined as 4.9 at the end of the first polymerization stage and as 7.3 at the end of the second polymerization stage. The dispersion polymer had a glass transition temperature $Tg^1$ of –2.0° C. and a glass transition temperature $Tg^2$ of 15° C.

Comparative Example 7 (Comparative Dispersion V7)

In a 2 l polymerization vessel fitted with feeding devices and a temperature control means at room temperature under a nitrogen atmosphere
260.0 g of deionized water and
12.0 g of Rhodafac® RS610/A25
were initially charged and heated to 90° C. with stirring. Once this temperature had been reached 30.4 g of feed 1 were added and then 33.8 g of a 2.5% by weight aqueous solution of ammonium peroxodisulfate were added over 2 minutes and the mixture was then stirred for a further 10 minutes at the abovementioned temperature. Commencing concurrently with the addition of the ammonium peroxodisulfate solution 32.6 g of a 5.3% by weight aqueous solution of ammonia were continuously added over a period of 175 minutes at a constant flow rate.
After the 10 minutes further stirring time had elapsed and while maintaining a temperature of 90° C. the remainder of feed 1 was continuously added over 175 minutes at a constant flow rate. Commencing concurrently with the addition of the remainder of feed 1 60.7 g of a 2.5% by weight aqueous solution of ammonium peroxodisulfate were likewise continuously added over 170 minutes. After termination of feed 1 the polymerization mixture was allowed to react at 90° C. for a further 20 minutes. The obtained aqueous polymer dispersion was then cooled to 75° C. and commencing concurrently 10.1 g of a 10% by weight aqueous solution of tert-butyl hydroperoxide, and in a simultaneous feed 9.9 g of a 6% by weight aqueous solution of Brüggolit® FF6 M, were continuously added over 10 minutes. The polymerization mixture was subsequently stirred at 70° C. for 20 minutes, cooled to room temperature and with stirring admixed with 1.2 g of a 5% by weight aqueous solution of Acticid® MBS.
Feed 1 (homogeneous mixture of):

| | |
|---|---|
| 152.7 g | deionized water |
| 14.4 g | Rhodafac ® RS610/A25, |
| 3.0 g | Disponil ® FES 993, |
| 209.0 g | styrene |
| 196.9 g | 2-ethylhexyl acrylate |
| 18.2 g | Sipomer ® PAM-200, |
| 14.1 g | methyl methacrylate, |
| 133.3 g | n-butyl methacrylate |
| 22.4 g | acetoacetoxyethyl methacrylate, |
| 6.2 g | acrylic acid |

The aqueous polymer dispersion obtained after filtration had a solids content of 50.0% by weight. The weight-average particle diameter was determined as 98 nm, the coagulate content as <0.1% by weight and the fine coagulate content as 467 µg/g of aqueous polymer dispersion. The pH of the aqueous polymer dispersion was determined as 5.1. The dispersion polymer had a glass transition temperature Tg of 14° C.

Comparative Example 8 (Comparative Dispersion V8)

Production of comparative example 8 was carried out completely analogously to the production of example 1 with the exception that in feed 1 96.9 g instead of 196.9 g of styrene and 296.9 g instead of 196.9 g of 2-ethylhexyl acrylate were employed.

The aqueous polymer dispersion obtained after filtration had a solids content of 49.5% by weight. The weight-average particle diameter was determined as 127 nm with a second fraction at 880 nm, the coagulate content as 1% by weight and the fine coagulate content as 8744 μg/g of aqueous polymer dispersion. The pH was determined as 4.2 at the end of the first polymerization stage and as 6.7 at the end of the second polymerization stage. The dispersion polymer had a glass transition temperature $Tg^1$ of −32° C. and a glass transition temperature $Tg^2$ of −8° C.

Performance Testing

For the performance testing a clear lacquer and a pigmented anticorrosion coating were produced from each of the obtained aqueous polymer dispersions of the examples and the comparative examples. To this end the polymer dispersions 1 to 6 and V5 to V8 were first diluted with deionized water to a solids content of 49.5% by weight.

Production of the Clear Lacquers

Production of the clear lacquers was carried out such that in each case 96.0 g of the aqueous polymer dispersions 1 to 6 and V5 to V8 diluted to 49.5% by weight were adjusted to a pH of 9.5 with a 50% by weight aqueous solution of dimethylethanolamine from Huntsman Corporation at room temperature with stirring and then in each case 3 g of the organic solvent Texanol® from Eastman Chemical and 1 g of the anticorrosion inhibitor CHE®-COAT-CI LNF A4 from C. H. Erbslöh KG were added and the mixture was mixed until homogeneous. The obtained clear lacquers are hereinbelow referred to as clear lacquer 1 to 6 and V5 to V8.

Early Water Test

The clear lacquers 1 to 6 and V5 to V8 to be tested were each applied to a surface of a 200×80 mm cleaned and grease-free, ungalvanized steel sheet with a box-type blade coater, wherein the gap size was chosen such that a dry layer thickness of 40 to 85 μm was obtained. The thus-coated steel sheets (referred to hereinbelow as steel sheets 1 to 6 and V5 to V8) were each dried for two hours at 23° C. and 50% relative atmospheric humidity in a climate controlled cabinet. Actual testing was then carried out such that the steel sheets 1 to 6 and V5 to V8 were placed vertically in a water bath filled with deionized water to a fill height of 15 cm for 24 hours at room temperature. The steel sheets 1 to 6 and V5 to V8 were then removed from the water bath, dabbed dry with a soft cotton cloth and the respective change in color tone between the area wetted with water and the unwetted area was assessed. The change in color tone was visually evaluated according to the following scale: 0 (no change) to 5 (clear change in color tone over whole area). The results obtained are reported in table 1 below.

TABLE 1

| Results of early water test | |
|---|---|
| Steel sheet | Evaluation |
| 1 | 0 |
| 2 | 0 |
| 3 | 0 |
| 4 | 1 |
| 5 | 1 |
| 6 | 0 |

TABLE 1-continued

| Results of early water test | |
|---|---|
| Steel sheet | Evaluation |
| V5 | 4 |
| V6 | 2 |
| V7 | 2 |
| V8 | 3 |

Production of the Pigmented Anticorrosion Coatings 167.9 g of the aqueous polymer dispersions 1 to 6 and V5 to V8 diluted to 49.5% by weight were in each case admixed at room temperature with 1.5 g of the commercially available defoamer for coatings BYK® 022 (Byk GmbH; mixture of polysiloxanes and hydrophobic solids in polyglycol). Subsequently a Dispermat was used to add in each case 15.0 g of deionized water, 1.0 g of a 25% by weight aqueous ammonia solution, 1.5 g of Dispex® Ultra PA4570 (BASF SE; dispersing additive, based on modified polyacrylate) and 4.5 g of Dispex® CX 4231 (BASF SE; dispersing additive based on an ammonium salt of an organic acid copolymer in water). With stirring a mixture of 2.2 g of phenoxypropanol (film-forming assistant) and 2.2 g of benzine (boiling range 180° C. to 210° C.; film-forming assistant) was further incorporated. Subsequently 25.5 g of the hematite pigment Bayferrox® 130 M (Lanxess AG), 10.8 g of talc 20 M 2 (Luzenac; filler: magnesium silicate), 38.3 g of Litopone® L (Sachtleben, filler based on barium sulfate and zinc sulfide), and 24.6 g of Heucophos® ZMP (Heubach, anticorrosion pigment based on zinc phosphate) were added. Then a further 0.8 g of BYK® 022 and 1.1 g of a 1:1 mixture of water and corrosion inhibitor L 1 (C. H. Erbsloh KG) were added. The entire mixture was premixed for 10 minutes in a dissolver with a toothed disk (diameter 5 cm; 2000 revolutions per minute) and subsequently dispersed for 20 minutes with a twin Teflon disk (diameter 5 cm; 2300 revolutions per minute) and 200 g of glass pearls (diameter 3 mm). The glass pearls were then removed by sieving. Finally, the respective batches were admixed with 1.8 g of a 25% by weight aqueous ammonia solution and a mixture of 0.3 g of a 25% by weight aqueous solution of a commercially available urethane-based thickener (Rheovis® PU 1280, BASF SE) and 1.0 g of butylglycol (solvent) and the pH was optionally adjusted to 9.5 with 25% by weight aqueous ammonia solution. The obtained anticorrosion formulations 1 to 6 and V5 to V8 had a solids content of 61% by weight and a pigment/volume concentration of 23%. The obtained anticorrosion formulations were diluted to a viscosity of approximately 300 mPas (determined at room temperature using a Rotothinner 455N sphere from Sheen Instruments) with deionized water and the respective solids contents were determined.

It should be noted in this context that the anticorrosion formulation V6 thickened immediately after production so that this formulation could not be used for coating a steel sheet.

Salt Spray Test

To test the anticorrosion properties a salt spray test according to DIN EN ISO 7253 (360 hour test duration) was performed using a 5% by weight aqueous sodium chloride solution. To this end the diluted anticorrosion formulations 1 to 6 and V5, V7 and V8 were each applied to one side of a 200×80 mm cleaned, ungalvanized steel sheet with a box-type blade coater, wherein the gap size was in each case chosen such that a dry layer thickness of 60 to 100 μm was obtained. The test sheets obtained after coating were stored and thus dried at 23° C. and 50% relative atmospheric humidity in a climate controlled cabinet for 6 days. The coated test sheets were then stored at a temperature of 50° C. for a further 24 hours. After cooling to room temperature to protect against corrosion the reverse sides of the respective test sheets were coated with a solvent-based coating and then dried at room temperature for 24 hours. Before the actual test the edges of the respective test sheets were taped-up with a plastic film. The respective test sheets were then scored down to the steel on the coated side with a scribe and sprayed with salt water for 360 hours. Evaluation of the obtained test sheets 1 to 6 and V5, V7 and V8 was carried out by optical comparison of the tested samples with the standards specified by DIN EN ISO 7253. The corrosion behavior of the individual test sheets was evaluated as follows with reference to subsurface corrosion around the score, surface corrosion and adhesion by means of the cross-cut test.

Subsurface Corrosion Around Score (as Per DIN EN ISO 4628-8; 2013):

Corrosion formed below the coatings proceeding from the sites of artificial damage. The values reported in table 2 indicate the maximum distance in millimeters of the thus formed iron oxide as measured from the scores. Before inspection, loose coatings around the scores were removed using adhesive tape. The lower the measured values, the better the assessment according to the invention.

Surface Corrosion:

Determination was carried out by visual determination of the fraction of the corroded surface area relative to the total surface area of the test sheets. The values reported in table 2 represent the percentage fraction of corroded surface areas. In this case, the lower the measured values, the better the assessment.

Adhesion (Cross-Cut Test According to DIN EN ISO 2409):

The adhesion of the anticorrosion coatings to the substrate was determined by means of the cross-cut test. To this end, after the salt spray test a grid composed of a plurality of cuts (line spacing 2 mm) was cut into the respective dabbed-dry anticorrosion coating, covered with adhesive tape and then the adhesive tape was removed. The appearance of the grid was assessed after removal of the adhesive tape. Scores of 0 to 5 were given according to the following scale:

| Gt 0 | The edges of the cuts were completely smooth and none of the quadrants of the grid had flaked off. |
| Gt 1 | The coating had flaked off along the cut edges but the flaked-off area was not more than 15% of the cross-cut area. |
| Gt 2 | The flaked-off grid area was more than 15% but not more than 35%. |
| Gt 3 | Along the cut edges the coating had partially or completely flaked off in broad strips or some quadrants had partially or completely flaked off. |
| Gt 4 | The affected cross-cut area was more than 35% but not more than 65%. |
| Gt 5 | Any flaking that could be classified as more severe than Gt 4. |

The thus obtained results are likewise reported in table 2 below.

TABLE 2

Results of salt spray test

| Test sheet | Subsurface corrosion around score [in mm] | Surface corrosion [in %] | Cross-cut |
|---|---|---|---|
| 1 | 5 | <5 | Gt 0 |
| 2 | 8 | <5 | Gt 1 |
| 3 | 6 | <5 | Gt 0 |
| 4 | 2 | <5 | Gt 0 |
| 5 | 9 | 5 | Gt 1 |
| 6 | 7 | <5 | Gt 0 |
| V5 | 20 | 15 | Gt 2 |
| V7 | 10 | 10 | Gt 1 |
| V8 | 15 | 20 | Gt 5 |

Determining Film Hardness

Film hardness was determined by the König pendulum damping test according to DIN EN ISO 1522. Determination was carried out such that the diluted anticorrosion formulations 1 to 6 and V5, V7 and V8 were each applied to one side of a 200×80 mm cleaned, ungalvanized steel sheet with a box-type blade coater, wherein the gap size was in each case chosen such that a dry layer thickness of 60 to 100 µm was obtained. The obtained coated test sheets were stored for 20 hours at 50° C. in a drying cabinet and subsequently cooled to room temperature. The König pendulum damping test according to DIN EN ISO 1522 was performed on the thus obtained coated steel sheets. The results obtained during testing of the steel sheets coated with the anticorrosion formulations 1 to 6 and V5, V7 and V8 are reported in table 3. The higher the number of pendulum strokes, the harder the coating.

TABLE 3

Film hardness results

| Steel sheet | Number of pendulum strokes |
|---|---|
| 1 | 17 |
| 2 | 18 |
| 3 | 30 |
| 4 | 22 |
| 5 | 17 |
| 6 | 16 |
| V5 | 15 |
| V7 | 8 |
| V8 | 5 |

It is unambiguously apparent from the results of the performance testing that the coatings produced with the anticorrosion formulations produced with the polymer dispersions according to the invention exhibit markedly better values in respect of subsurface corrosion around the score, surface corrosion, cross-cut testing and film hardness than the anticorrosion formulations produced with the corresponding comparative dispersions.

The invention claimed is:

1. A process for producing an aqueous polymer dispersion by free-radically initiated aqueous emulsion polymerization, the process comprising:
(i) free-radically polymerizing, in an aqueous medium in the presence of at least one phosphorus-containing dispersing aid, in a first polymerization stage (polymerization stage 1), ≥1.0 and ≤3.0% by weight of at least one α,β-monoethylenically unsaturated $C_3$- to $C_6$-mono- or -dicarboxylic acid (monomers A1), ≥1.5 and ≤6.0% by weight of at least one ethylenically unsaturated compound comprising at least one phosphorus-containing group (monomers A2), and ≥91.0% and ≤97.5% by weight of at least one ethylenically unsaturated compound distinct from the monomers A1 and A2 (monomers A3), wherein the amounts of the monomers A1 to A3 sum to 100% by weight (total monomer amount 1), to obtain a polymer 1; and, subsequently, (ii) free-radically polymerizing, in the presence of the polymer 1, in a second polymerization stage (polymerization stage 2), ≤0.1% by weight of at least one α,β-monoethylenically unsaturated $C_3$ to $C_6$-mono- or -dicarboxylic acid (monomers B1), ≤0.1% by weight of at least one ethylenically unsaturated compound comprising at least one phosphorus-containing group (monomers B2), and ≥99.8% and ≤100% by weight of at least one ethylenically unsaturated compound distinct from the monomers B1 and B2 (monomers B3), wherein the amounts of the monomers B1 to B3 sum to 100% by weight (total monomer amount 2), to obtain a polymer 2, with the proviso that a glass transition temperature $Tg^1$ of the polymer 1 is ≥−5° C. and ≤10° C., a glass transition temperature $Tg^2$ of the polymer 2 is ≥10° C. and ≤40° C. and is at least 10° C. above the glass transition temperature $Tg^1$ [$Tg^2$=$Tg^1$+≥10° C.], a ratio of the total monomer amount 1 to the total monomer amount 2 is 70% to 85% by weight to 15% to 30% by weight and an amount of the at least one phosphorus-containing dispersing aid is ≥0.5% by weight based on a sum of the total monomer amount 1 and the total monomer amount 2 (total monomer amount).

2. The process of claim 1, wherein the monomers A1 are acrylic acid, methacrylic acid, itaconic acid, fumaric acid, maleic acid and/or crotonic acid.

3. The process of claim 1, wherein the monomers A2 are vinylphosphonic acid and/or a (meth)acryloxy(poly)alkoxy phosphate.

4. The process of claim 1, wherein the monomers A3 are to an extent of ≥80% by weight selected from the group consisting of n-butyl acrylate, n-butyl methacrylate, 2-ethylhexyl acrylate, styrene and methyl methacrylate.

5. The process of claim 1, wherein no monomers B1 and B2 whatsoever are employed.

6. The process of claim 1, wherein the polymerization stages 1 and 2 are performed at a pH in a range of from ≥3 to ≤8 measured at room temperature.

7. The process of claim 6, wherein a pH adjustment is carried out with a base having a boiling point ≤20° C., measured at 1.013 bar (absolute).

8. The process of claim 1, wherein the monomers A3 are to an extent of >0% and ≤20% by weight selected from the group consisting of 2-hydroxyethyl acrylate, 2-hydroxyethyl methacrylate, 2-(acetoacetoxy)ethyl methacrylate, 2-ureidoethyl methacrylate, diacetone acrylamide, glycidyl methacrylate, 3-(methacryloyloxy)propyltrimethoxysilane, vinyltriethoxysilane, allyl methacrylate and 1,4-butanediol diacrylate.

* * * * *